No. 883,762. PATENTED APR. 7, 1908.
J. J. THOMPSON.
FARM GATE.
APPLICATION FILED SEPT. 18, 1907.
2 SHEETS—SHEET 1.
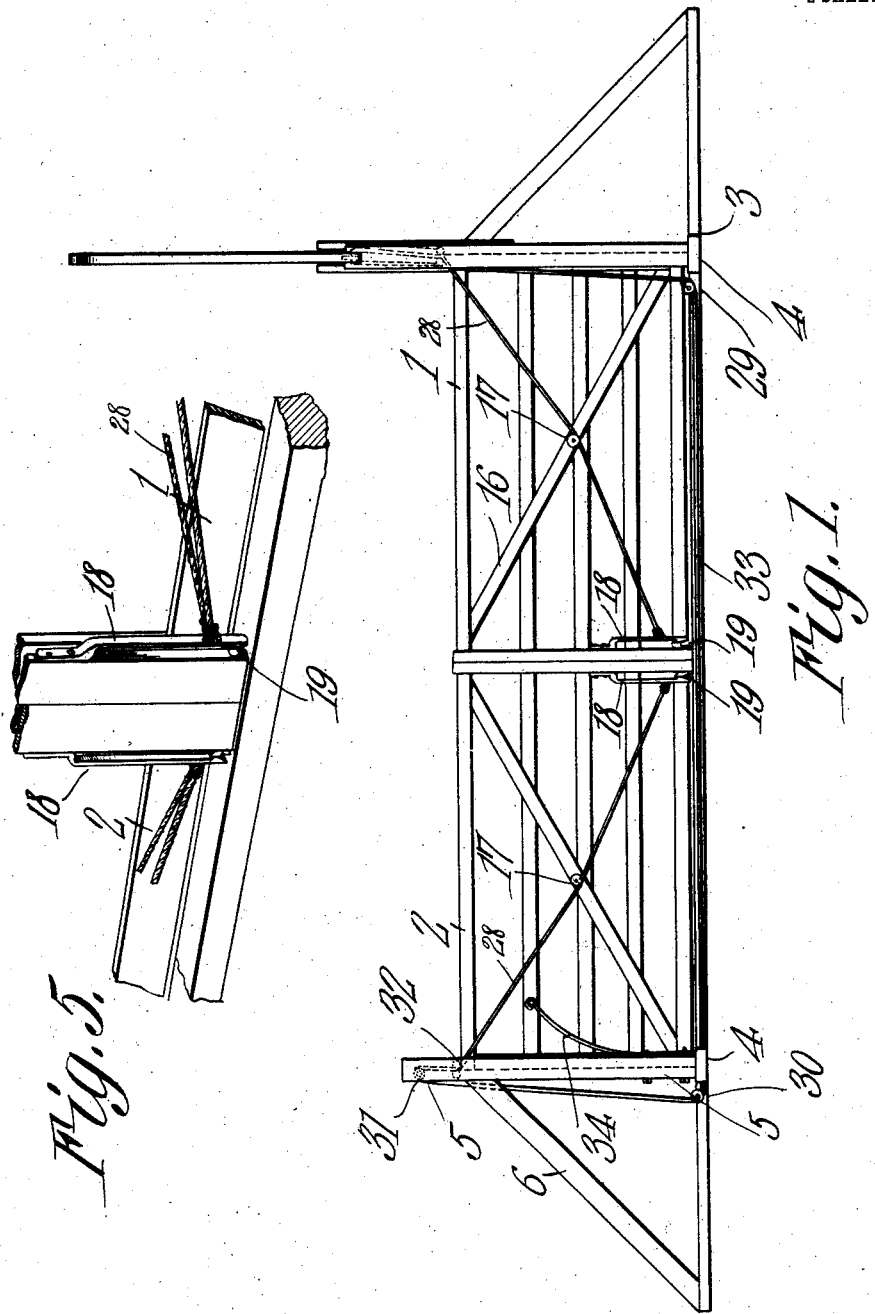
WITNESSES:
John J. Thompson, INVENTOR.
By C. A. Snow & Co.
ATTORNEYS

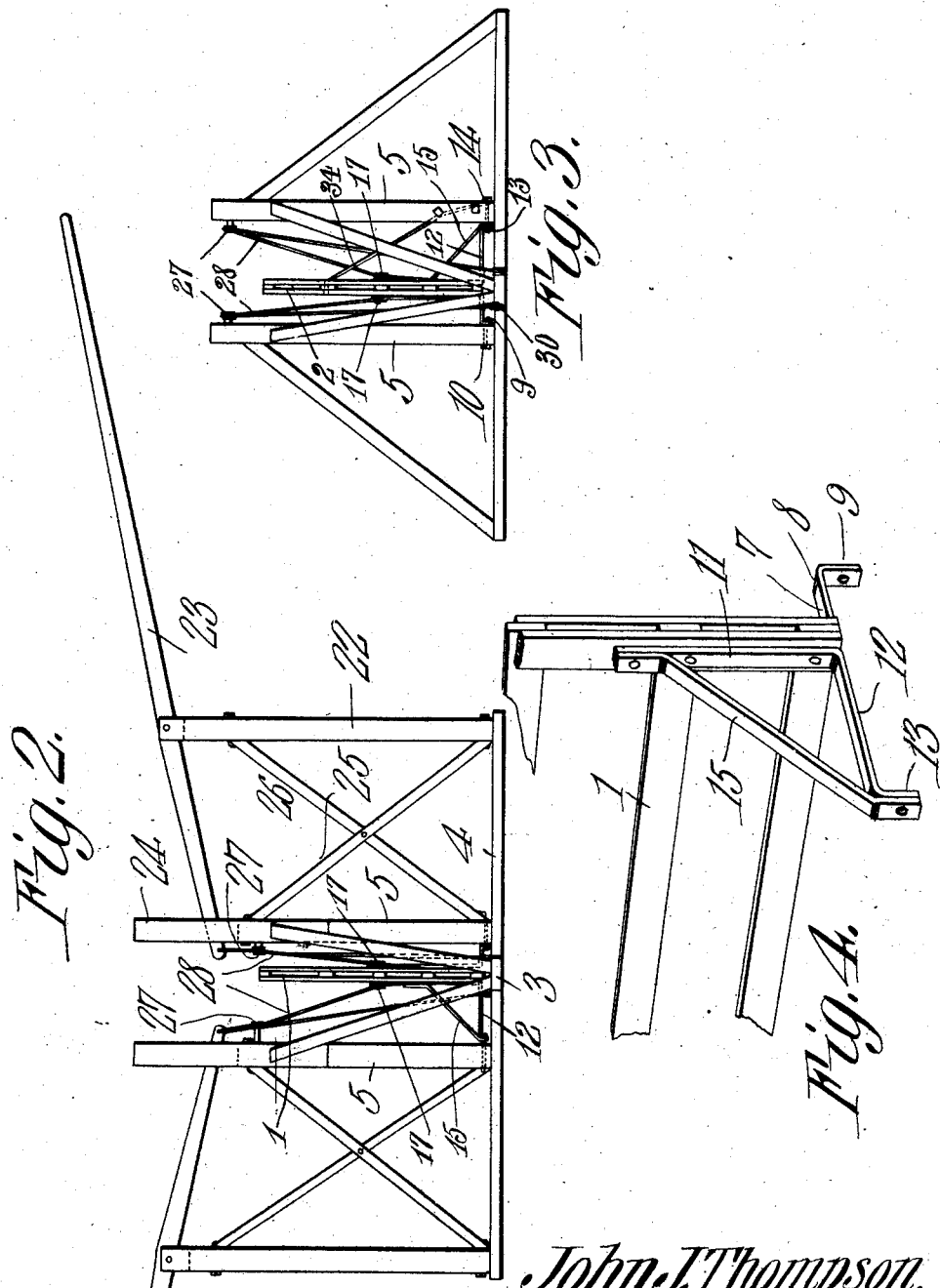

UNITED STATES PATENT OFFICE.

JOHN JAMES THOMPSON, OF SPRINGFIELD, OKLAHOMA.

FARM-GATE.

No. 883,762.

Specification of Letters Patent.

Patented April 7, 1908.

Application filed September 18, 1907. Serial No. 393,524.

*To all whom it may concern:*

Be it known that I, JOHN JAMES THOMPSON, a citizen of the United States, residing at Springfield, in the county of Comanche and State of Oklahoma, have invented a new and useful Farm-Gate, of which the following is a specification.

This invention has relation to farm gates and it consists in the novel construction and arrangement of its parts as hereinafter shown and described.

The object of the invention is to provide a gate having vertically swinging twin members and means for operating the same the said members being mounted upon a frame work adapted to rest upon the surface of the ground and which is so constructed as to avoid the necessity of using posts embedded in the ground.

In the accompanying drawings:—Figure 1 is a side elevation of the gate, showing the gate members closed. Fig. 2 is an end elevation of that portion of the gate frame upon which the levers are mounted. Fig. 3 is an end elevation of the opposite end portion of the gate. Fig. 4 is a perspective view of the lower end portion of one of the gate members, showing the means for pivotally mounting the same, and Fig. 5 is a perspective view of the lower inner ends of the gate members with parts broken away, showing the spring latches carried by the said members.

The gate consists of twin members 1 and 2 which are provided at their lower outer corners with means (hereinafter described) for pivotally connecting the same with the gate frame.

The gate frame consists of the sill 3 which lies under the members 1 and 2 and which extends across the road-way or thoroughfare upon which the gate is used. The transversely disposed pieces 4 are attached to the sill 3 in the vicinity of the ends thereof and the uprights 5 are mounted upon the said pieces 4. The braces 6 are attached at their upper ends to the uprights 5 and at their lower ends to the extremities of the sill. The uprights 5 are arranged in pairs, the members of which are located opposite each other and upon opposite sides of the sill 3.

The means for pivotally mounting the members 1 and 2 consists of a side strip 7 which is applied to the lower outer corner portion of the gate member and which is provided at a point in the vicinity of the lower edge of the member with a short laterally disposed portion 8 lying substantially in the same plane with the lower edge of the gate member and which merges into a vertical portion 9 which is perforated to receive a pivot bolt 10 which passes transversely through one of the uprights 5, at the base thereof. The strip 11 is attached to the opposite side of the gate member and is provided with a relatively long laterally disposed portion 12 which lies in the same plane as the portion 8 of the strip 7. The portion 12 merges into the vertically disposed extremity 13 which is perforated to receive the pivot bolt 13 carried by the upright 5 opposite to the upright 5 provided with the bolt 10. The brace 15 is attached to the opposite ends of the strip 11 and is obliquely disposed with relation to the portion 12 thereof.

Each of the gate members 1 and 2 is preferably provided with a diagonal brace 16 upon which is mounted a pulley 17. Said pulley is located slightly below a line drawn from the corners of the gate member and which intersects the brace 16. The inner lower edge of each of the members 1 and 2 is provided with a latch 18 which is adapted to engage a keeper 19 attached to the sill 3. The uprights 22 are erected upon the extremities of one of the pieces 4 and the levers 23 are fulcrumed at the upper ends of said uprights. The inner ends of said levers are guided between the slats 24 attached to the upper ends of the uprights 5. The braces 26 are attached at their lower ends to the uprights 5 and at their upper ends to the uprights 22 and intersect the braces 25 which are attached at their lower ends to the uprights 22 and at their upper ends to the uprights 5. The pulleys 27 are arranged in pairs and are journaled for rotation upon the uprights 5. A cable 28 is attached at its upper end to each of the levers 23 and each said cable passes between one set of the pulleys 27 and under one of the pulleys 17 which are located upon opposite sides of the gage member 1 (see Figs. 2 and 3) and both of the said cables are connected to the latch mechanism of the gate member 1. A pulley 29 is journaled upon each side of the sill 3 in the vicinity of the lower outer part of the gate member 1. A pulley 30 is similarly journaled in the vicinity of the lower outer corner of the gate member 2 and the pulleys 31 are journaled upon the upper ends of the uprights 5 located at the outer end of the gate member 2. The pulleys 32 are arranged in pairs similar to the arrangement of the pulleys 27 and are also journaled upon the uprights 5 between which the gate member 2 is pivotally mounted. The cables 33 are attached at their upper ends to the inner ends of the levers 23 and pass under the pulleys 29 and along the intermediate portion of the sill 23, under the pulleys 30, over the pulleys 31, between the pulleys 32 and under the pulleys 17 mounted upon the gate member 2 and attached to the latch 18 carried by the gate member 2. The spring 34 is fixed at its lower end to one of the uprights 5 to which the gate member 2 is pivoted and the upper end of said spring is attached to the side of the said member at a point within the edge thereof so that the said spring is distorted out of a vertical position when the gate member 2 is in its closed or open positions. Consequently the said spring is under tension when the gate member 2 is either closed or open.

From the foregoing description it is obvious that when the outer end of either one of the levers 23 is depressed the inner end of the said lever elevates and carries up with it the cables 28 and 33 which in their initial movement withdraw the latch 18 from the keepers 19. And when this is done the stress is exerted directly upon the gate members 1 and 2 which rest against each other at their inner ends when closed and the inner ends of the said members are elevated and the said members are simultaneously swung vertically away from each other upon their pivotal supports. In as much as the spring 34 is under tension when the gate member 2 is closed the tension of the said spring assists in the initial movement of the gate members and when the members are opened the said spring 34 is also under tension and adapted to assist in returning the gate members to closed position. In as much as the inner ends of the members 1 and 2 bear directly against each other when in closed position and the said members are supported by bolts which pass through perforations provided in the extremities 9 and 13 of the strips 7 and 11 respectively and as the said extremities are located below the lower edges of the gate members the said members in being opened must be lifted bodily at the initial movement. That is to say they must be lifted in order to bring any of the weight directly above or beyond the pivotal supports for the members. The arrangement of the pulleys and the cables and the operating levers is such as to facilitate the lifting operation as well as the swinging of the gate members after the weight thereof has been distributed upon opposite sides of the pivotal support. It is obvious that a downward movement of either one of the levers 23 is sufficient to open or close the gate members 1 and 2.

Having described my invention what I claim as new and desire to secure by Letters Patent is:—

1. A gate comprising a frame having a sill and uprights located at the opposite end portions thereof, a gate member pivotally mounted between the uprights at one of the end portions of the sill, a lever fulcrumed at the uprights at the other end portion of the sill, a cable attached at one end to the lever and at its other end to the gate member and passing from the lever below the upper surface of the sill thence to the upright to which the gate member is pivoted thence over a pulley supported by the said uprights at a point above the gate member.

2. A gate comprising a frame, gate members pivoted thereto and adapted to swing in a vertical plane, pulleys journaled upon the frame, operating cables attached to the levers and gate members and engaging said pulleys, the pivotal connection from each gate member consisting of side strips, each of which is provided with a laterally disposed portion, one of which is longer than the other and both of which merge into vertically disposed extremities, pivot bolts passing through the frame and said extremities and a catch mechanism for the inner ends of the gate members.

In testimony that I claim the foregoing as my own, I have hereto affixed my signature in the presence of two witnesses.

JOHN JAMES THOMPSON.

Witnesses:
L. C. SNODGRASS,
C. W. LUDWICK.